UNITED STATES PATENT OFFICE.

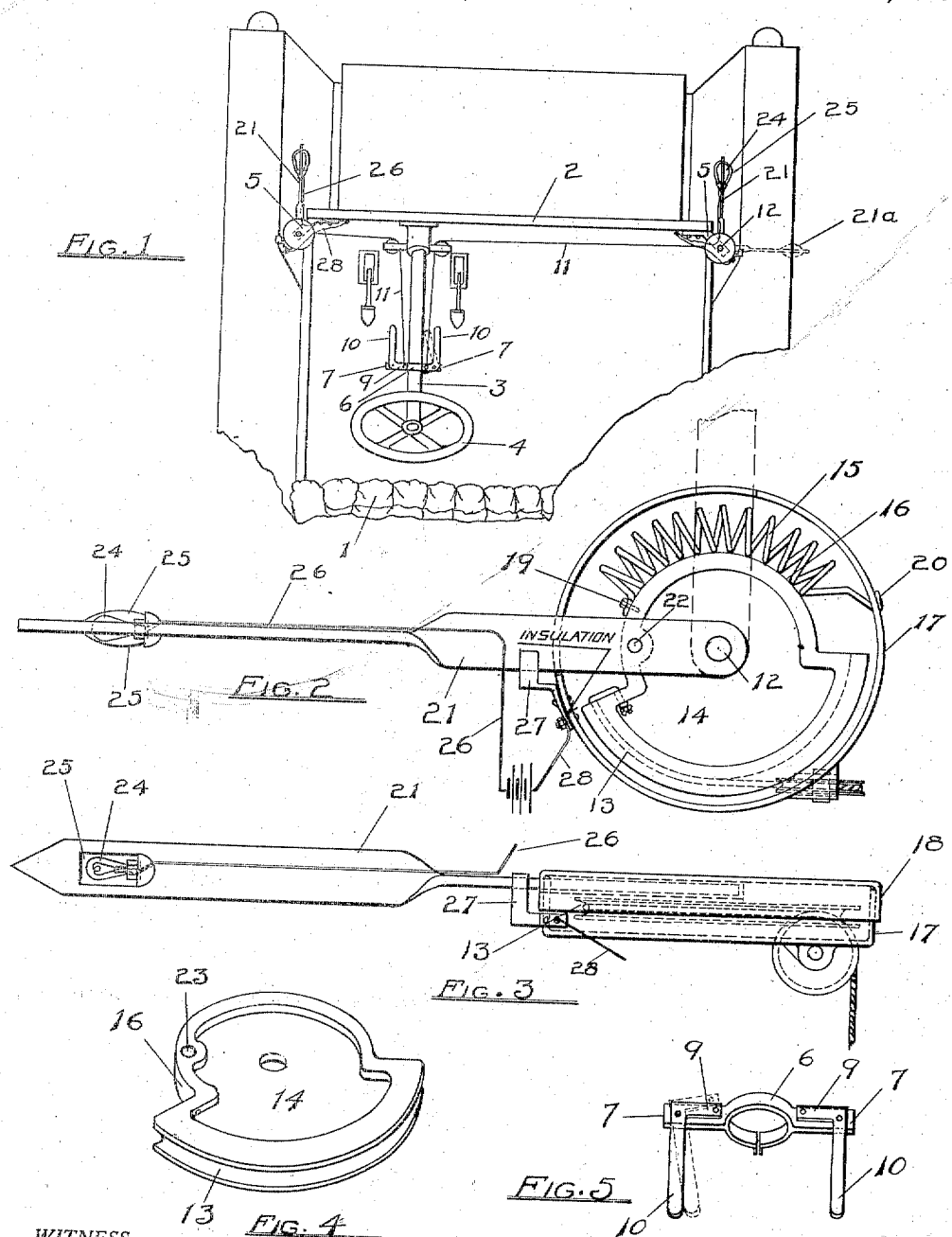

CHESTER H. BEARDSLEY, OF ARLINGTON, OREGON.

VEHICLE-SIGNAL.

1,254,113.

Specification of Letters Patent.  Patented Jan. 22, 1918.

Application filed July 5, 1916.  Serial No. 107,607.

*To all whom it may concern:*

Be it known that I, CHESTER H. BEARDSLEY, a citizen of the United States, residing at Arlington, county of Gilliam, State of Oregon, have invented certain new and useful Improvements in Vehicle-Signals, of which the following is a specification.

My invention relates in general to vehicle signals for the purpose of notifying the public of the intended movements of the vehicle, and particularly as herein illustrated and described my invention relates to automobile signal devices.

The object of my invention is to produce a neat, cheap, strong and easily attached device that may be operated by the driver without necessitating the removal of the hands or feet from their respective positions upon the controlling apparatus of the automobile.

I accomplish the above object by means of the construction illustrated in the accompanying drawings, which therefore become a part of this application for Letters Patent, and in which:—

Figure 1 is a plan view of the front portion of an automobile, showing my invention installed thereon.

Fig. 2 is a plan view of the signal portion of my invention shown upon an enlarged scale.

Fig. 3 is a side elevation of the subject matter of Fig. 2.

Fig. 4 is a perspective view of the operating sheave.

Fig. 5 is a perspective view of the operating levers.

Like characters of reference indicate like parts throughout the several views.

In Fig. 1 the numeral 1 represents the front seat of an automobile, 2 is the dash board, 3 is the steering column and 4 is the steering wheel.

In general my invention consists of a signal device pivotally mounted upon a bracket 5 secured to the dashboard 2, and connected by means of flexible members, as cords or the like, to operating members mounted upon the steering column 3, said operating members being disposed so as to be contiguous to the knees of the driver, and therefore easily operated by a slight pressure from the knee, and thus requiring no removal of the hands or feet from their respective places upon the controlling apparatus of the automobile.

The operating device consists of a collar 6 adapted to clamp upon the steering column and having oppositely disposed radial extensions 7 whereon are pivotally mounted bell-cranks, said bell-cranks having arms 9 radially disposed relatively to collar 6 and arms 10 normal to arms 9 and disposed parallel to the steering column 3 as shown in Figs. 1 and 5, arms 9 being connected to cords 11, and arms 10 being adapted for operation by the knee of the driver.

As a means of operating the signal arms I provide a sheave 14 rotatably mounted upon a pin 12 secured to bracket 5.

Said sheave 14 is operable by a cord 11 which is disposed within a peripheral groove 13 upon a portion of the periphery of the sheave, and a circumferentially disposed spring 15 is seated upon a peripheral cylindrically faced portion 16 of sheave 14.

Surrounding said sheave and spring is a box or container 17 secured by pin 12 to bracket 5, and a cover 18, as shown in Fig. 3.

One end of spring 15 is secured to sheave 14 as shown at 19, and the opposite end of said spring is attached to container 17, as shown at 20 in Fig. 2.

The signal arm 21 is pivoted upon pin 12 and secured to sheave 14 by means of a dowel 22 adapted to be secured in a dowel hole 23 in said sheave, by which construction the arm 21 and sheave 14 are caused to rotate as a unit.

When in idle position the arm 21 will point forward as shown in Fig. 1, but when operated by means of lever 10 and cord 11 the arm will rotate into position 21ª, thus indicating the intention of the driver to turn the vehicle in the direction indicated.

When lever 10 is released spring 15 returns the signal arm 21 to its initial position.

In order that the signal arm may be visible at night I mount thereon an electric bulb 24 surrounded by transparent shields 25, which shields may be suitably colored if desired.

One pole of said electric bulb is connected by a wire 26 to a battery, and the other pole of said electric bulb is connected at the socket thereof to arm 21.

A contact piece 27 is mounted upon container 17 in a position to make an electrical contact with arm 21 when same is moved to the display position 21ª, there being suitable insulation between the contact piece 27 and the container 17.

Contact piece 27 is connected to the battery by wire 28, thereby, when the arm is in position 21ª, completing an electric circuit from the battery through wire 28, contact piece 27, arm 21, electric bulb 24, and wire 26, which lights the electric bulb.

My invention may be made of any size and constructed of any material deemed convenient and suitable for a device of this character, and while I have illustrated and described a form of construction and arrangement of parts found desirable in materializing my invention I wish to include in this application for Letters Patent all mechanical equivalents or substitutes that may fairly be considered to come within the scope and purview of my invention as defined by the appended claims.

Having disclosed my invention so that others skilled in the art may be enabled to construct and to use same, what I claim as new and desire to secure by Letters Patent is:—

1. In a vehicle signal device, a hollow cylindrical container adapted to be mounted upon the dash board of said vehicle and having therein an opening upon the circumferential face thereof partially surrounding the same; a rotatable member pivotally mounted within said container and comprising a substantially semicircular peripherally grooved rim portion and a substantially semicircular cylindrical rim portion; a pointer arm secured to said rotatable member and extending beyond said container through said opening in the same; a spring within said container intermediate the circumference of the same and said cylindrical rim portion, one end thereof being secured to said rotatable member and the opposite end thereof being secured to said container; and a flexible member secured to said rotatable member, passing outside of said container, and coacting with said grooved rim portion to rotate said rotatable member and said pointer arm attached thereto.

2. In a vehicle signal device, a rotatable signal member; a substantially semicircular cylindrical rim member secured to said signal member; a substantially semicircular peripherally grooved rim member secured to said signal member and oppositely and diametrically disposed to said cylindrical rim member; a flexible member coacting with said grooved rim member to operate said signal member; and a spring coacting with said cylindrical rim member to return said signal member to its initial position after being operated.

In witness that I claim the foregoing as my own I hereunto affix my signature in the presence of two subscribing witnesses, at Arlington, county of Gilliam, State of Oregon.

CHESTER H. BEARDSLEY.

Witnesses:
 FRANK C. CLARK,
 CLAUD C. CLARK.